United States Patent [19]
Valentine

[11] 3,986,276
[45] Oct. 19, 1976

[54] EDUCATIONAL DEVICE FOR LEARNING SUSPENSION SYSTEM FUNDAMENTALS

[75] Inventor: Charles G. Valentine, Stamford, Conn.

[73] Assignee: Xerox Corporation, Stamford, Conn.

[22] Filed: Mar. 29, 1973

[21] Appl. No.: 345,948

[52] U.S. Cl. .................................................. 35/13
[51] Int. Cl.² ........................................ G09B 25/02
[58] Field of Search ............... 35/7 A, 10, 13, 19 A

[56] References Cited
UNITED STATES PATENTS

| | | | |
|---|---|---|---|
| 2,893,137 | 7/1959 | Alling | 35/19 A |
| 2,917,834 | 12/1959 | Butler | 35/19 A X |
| 3,077,696 | 2/1963 | Barnett | 35/19 A X |
| 3,080,664 | 3/1963 | Bland | 35/7 A X |
| 3,186,323 | 6/1965 | Niehaus | 35/7 A UX |
| 3,245,156 | 4/1966 | Blodis | 35/8 A |
| 3,423,846 | 1/1969 | Arend | 35/19 A |
| 3,520,074 | 7/1970 | Severin | 35/48 R |

OTHER PUBLICATIONS

Project Physics Course, Descriptive Catalog from Holt, Rinehart & Winston, p. 2.

*Primary Examiner*—Harland S. Skogquist

[57] ABSTRACT

An educational kit for teaching the operation and component parts of an automobile suspension and steering system is disclosed. The kit comprises an audio-visual instructional means, a simulator board upon which is graphically depicted indicia representing automotive suspension or steering systems and subsystems, and a plurality of manipulative pieces upon which are graphically depicted indicia which is relatable to the indicia depicted on the simulator board. The pieces are adapted for manipulation on the simulator board whereby the user of the kit may construct relationships and define concepts involved in the systems under study in response to the instructional means.

4 Claims, 9 Drawing Figures

AUDIO VISUAL MEANS

WORK SHEETS

EDUCATIONAL DEVICE FOR LEARNING SUSPENSION SYSTEM FUNDAMENTALS

BACKGROUND OF THE INVENTION

The present invention relates to an educational kit designed for training in automotive technology. More specifically, the invention deals with an educational learning kit designed to help students of automotive technology understand the assembly, relationship of parts and operation of automobile suspension and steering systems.

The automobile is a fairly complex piece of machinery constructed from many complex subsystems. When these subsystems are operating properly and cooperating with one another as they should, a pleasurable drive in the country is there but for the taking. However, when one or more of these subsystems malfunctions, a pleasurable drive in the country often becomes both a regrettable experience for the automobile owner and a delight to the automobile repairman.

Traditionally, an individual interested in automobile technology might avail himself of the opportunity to acquire the skills necessary for the occupation of automobile mechanic or repairman by any one of a number of routes. Often, such skills are acquired by attending trade schools, by taking courses in automotive technology, through military service training, by simple on-the-job training, or by self-training. Regardless of the route taken, the first goal which should be achieved is an understanding of the automobile and its component subsystems, and how each of these subsystems cooperate with one another to achieve a desired result. A second goal is an understanding of specific subsystems, including how they operate, what parts make up the subsystems, how these parts are assembled and how these parts relate to one another. Once these goals have been achieved, the individual is better equipped for training in diagnosis and repair of the various malfunctions occurring in automobile subsystems.

At some point during the learning process, it is most desirable that the student of automobile repair extend beyond charts, manuals or diagrams and be afforded the opportunity to see, examine and manipulate the actual subsystem under study or a model thereof. Physical exposure to the subsystem and its component parts aids the student in better understanding what he hears or reads about it, and complements the learning process by permitting him to inspect, manipulate and arrange the various parts.

Recent years have marked the introduction of a number of educational teaching devices generally aimed at the pre-college or pre-high school age group. The most common of these are the mechanical or computer devices designed to be used by individual students. The theory behind the increasing use of such devices is that account is made of the individual differences in ability, speed and grasp of subject matter, thereby permitting the student to learn at his own pace with minimum supervision by the teacher. Some of these devices also introduce new dimensions into the learning process wherein, for example, spelling may be associated with pictures of objects, mathematical concepts associated with the relative sizes and shapes of objects, or correct responses to questions posed by a computer rewarded by permission to proceed.

The advantages of a teaching method using a device geared for the individual should not be considered restricted to elementary school subjects; occupational learning materials that take into account individual differences in ability, speed and grasp of subject matter also have a better chance of being effective. However, at the present time there are very few educational devices available to the community colleges, vocational high schools and other special schools where various types of mechanical and electrical technologies are sought to be taught on a simplified and individualized basis. There is a great need for occupational learning devices which can be used by the individual student while learning a particular technology and which permit the student to physically simulate the construction or arrangement of parts or concepts involved in the particular systems or subsystems under study prior to examination of the actual system or subsystem.

Accordingly, it is an object of this invention to provide a novel approach toward the learning of automobile systems and subsystems.

Another object is to provide an educational kit comprising instructional means and simulator means for teaching the mechanism and operation of an automobile suspension and steering system.

Another object is to provide an occupational educational kit which is simple, relatively inexpensive, rugged, easily assembled, relatively portable and easily understood.

Another object is to provide an educational kit designed for use by individual students comprising audio, visual or audio-visual instructional means, a simulator board, and pieces having graphic indicia thereon representative of the parts or mechanisms involved in an automobile suspension and steering system, whereby the student may manipulate the pieces on the simulator board in response to said instructional means to graphically depict the assembly, relationship of parts and operation of an automobile suspension and steering system.

SUMMARY OF THE INVENTION

In accordance with the teachings of the present invention, a simple and effective educational kit for the teaching of the assembly, relationship of parts and operation of an automobile suspension and steering system is provided. The kit comprises an instructional means, a simulator board upon which is graphically depicted schematic views of an automobile steering linkage, front wheel suspension, and side view of an automobile frame, and a plurality of pieces upon which are graphically depicted other views of the steering linkage or suspension, as well as various of the major parts which constitute the suspension or steering system. The kit may also comprise a display board which provides for storage and easy access to the various pieces when the kit is in use. The kit is designed to present the fundamentals of the function, mechanism and operation of an automobile suspension and steering system using a programmed, multimedia approach whereby the student hears and sees information, performs by answering questions, solving problems and manipulating objects. The kit is designed for individual use or use by small groups without the need for extensive supervision or participation by an instructor. It permits the student to learn at his own pace, and also affords him the chance to capitalize on the way he learns best because he participates in different kinds of learning experiences. He listens to information while viewing a series of related visuals and participates in a manipulative activity which gives him a chance to try doing himself what he has been shown or told how to do. He is thus totally involved in the learning process.

DETAILED DESCRIPTION OF THE INVENTION

The instructional means employed in the kit is an audio-visual presentation using slides or filmstrips in conjunction with a descriptive audio account of the visuals. The visual materials are synchronized with the audio presentation. A recorded narrator provides background information descriptive of the various components of the automobile suspension and steering systems such as the automobile body construction, the various types of springs, frame design, the various components of the steering system and the wheels. During this audio presentation, a series of synchronized related visuals are shown to the students. These visuals comprise photographs or diagrams of the various components and mode of operation of the various systems and subsystems described in the audio presentation.

The audio-visual equipment needed will vary depending on the type of instruction to be given. A rear screen projector for small groups, or a projector and screen for a classroom presentation may be used. For the audio presentation tape recordings using either visual projection equipment with built-in audio capability or a separate cassette recorder may be used. The instructional means provided with the educational kit includes a visual segment available, for example, on 35mm slides or filmstrips, and an audio segment available on cassettes. The supporting equipment is normally not included.

At various points during the presentation, the student is requested to stop the audio-visual presentation and perform certain activities using the simulator board and pieces associated therewith. He may be requested to assemble a series of pieces representative of an automoobile body and springs in accordance with a pictured diagram, or to place pieces showing the various positions of the steering linkage components during left and right turns, or manipulate a piece representing a wheel to depict positive and negative camber. The simulator activity allows a student to actually use his hands as a learning tool as well as his eyes and ears. By performing an activity using the simulator board and its accessories, the student takes an active part in the learning process and achieves understanding more quickly.

The simulator board and the accessories are best described with reference to the attached drawings.

DETAILED DESCRIPTION OF THE DRAWINGS

Figure 1:
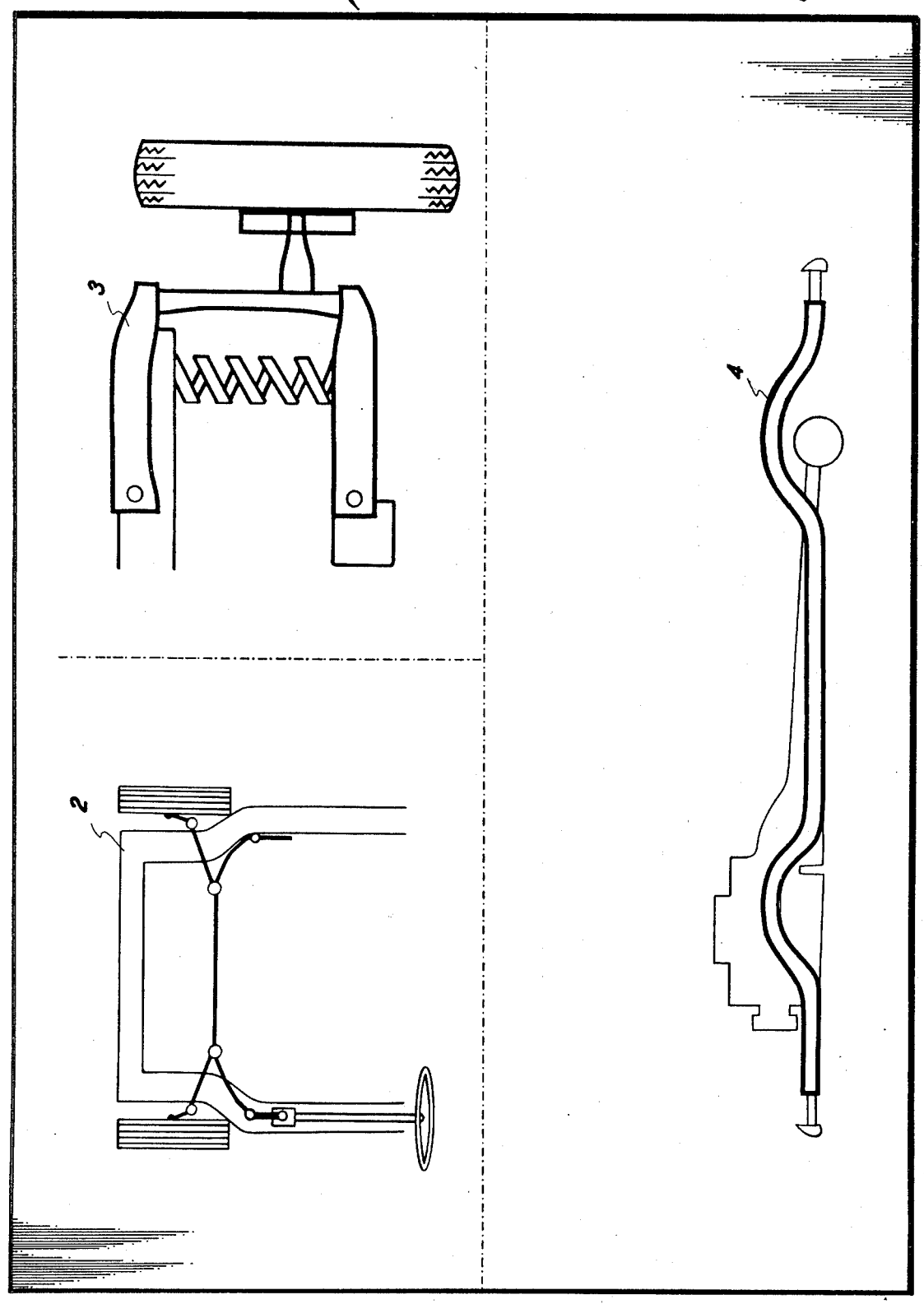
FIG. 1 is a plan view of the simulator board with graphic indicia thereon.

In FIG. 1, the simulator board 1 is shown having printed thereon graphic indicia representative of a schematic view 2 of an automobile steering linkage in position for straight ahead movement, a schematic view 3 of the front wheel suspension in an unloaded condition and a schematic side view 4 of an automobile frame. The simulator board may be constructed of a magnetically attractive sheet of rigid material such as ferrous metal or a magnetic ferrite plastic, or a thin sheet of ferrous metal coated with a thin layer of plastic material. The surface of the board is painted with a neutral background color such as a white or yellow enamel. The graphic indicia present on the board may be printed over the enamel in a suitably contrasting color such as black. Printing may be accomplished by any suitable means such as, for example, a silk screening process. Alternatively, the indicia may be printed on a sheet of clear plastic adapted to be superimposed over a blank board. Although the simulator board may consist solely of a thin sheet of metal with suitably smooth edges, the metallic sheet is preferably laminated to a suitable backing member which imparts suitable rigidity thereto. Thus, in the preferred embodiment the simulator board comprises a thin sheet comprising ferrous metal having a thickness of about 1/32 inch laminated to a backing member made from a rigid material such as fiberboard, or a resinous material, said backing material having a preferred thickness of about ¼ inch. The dimensions of the simulator board should be such that the board can be conveniently used by the student at a given workplace. Boards having dimensions of about 15 × 20 inches, or approximately 300 square inches, are particularly suitable.

Figure 2:
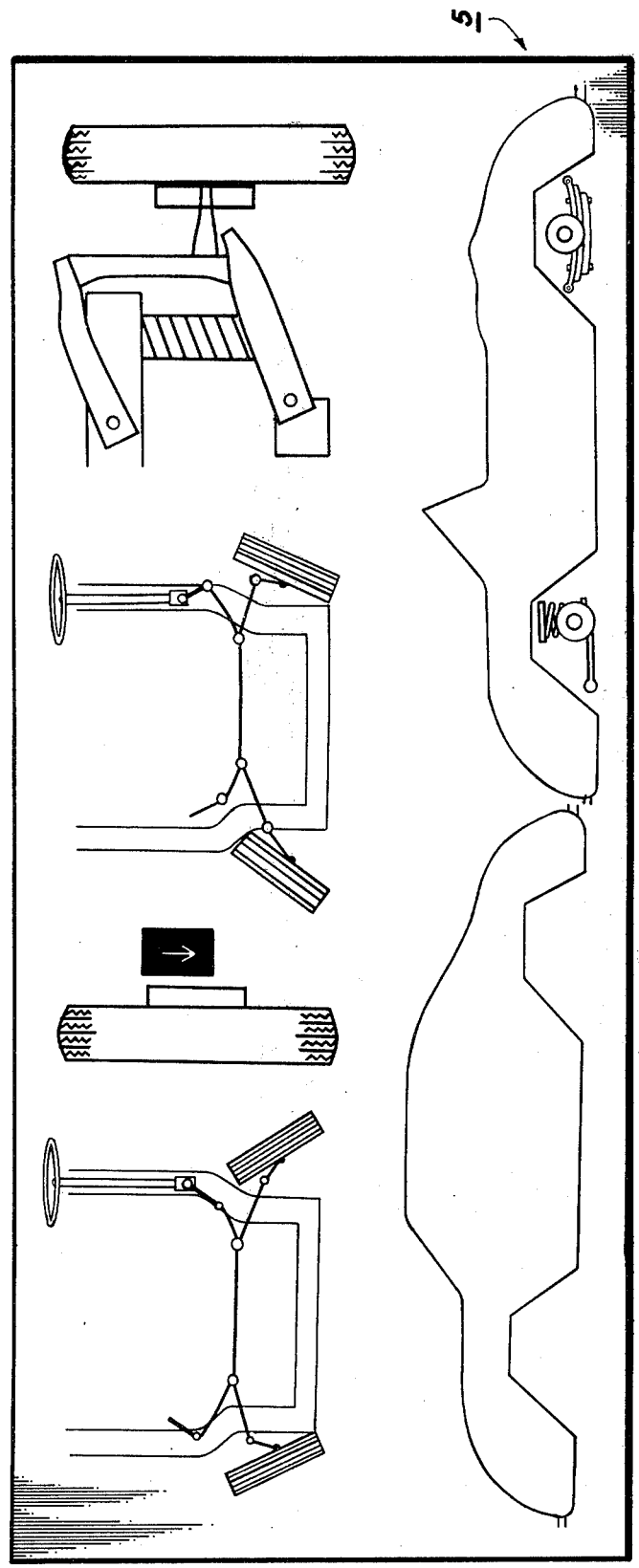
FIG. 2 is a plan view of the display board with graphic indicia thereon.

In FIG. 2 a display board 5 is shown having printed thereon graphic indicia representative of the various parts of the automobile suspension and steering systems, or views of the steering or suspension system during various phases of operation. The display board is also constructed on a magnetically attractive rigid material similar to the simulator board and the background and indicia may be printed thereon in the same way. The purpose of the display board is to serve as a display and storage area for the magnetically attractive pieces which are used in conjunction with the simulator board. Each of the spaced graphic indicia printed on the display board corresponds to the indicia printed on one of the pieces, thereby facilitating systematic storage and display of the pieces and allowing for quick inspection to determine that all of the pieces are accounted for. The edges of the board should be either smooth or rolled over to prevent injury from sharp edges.

Figure 3:
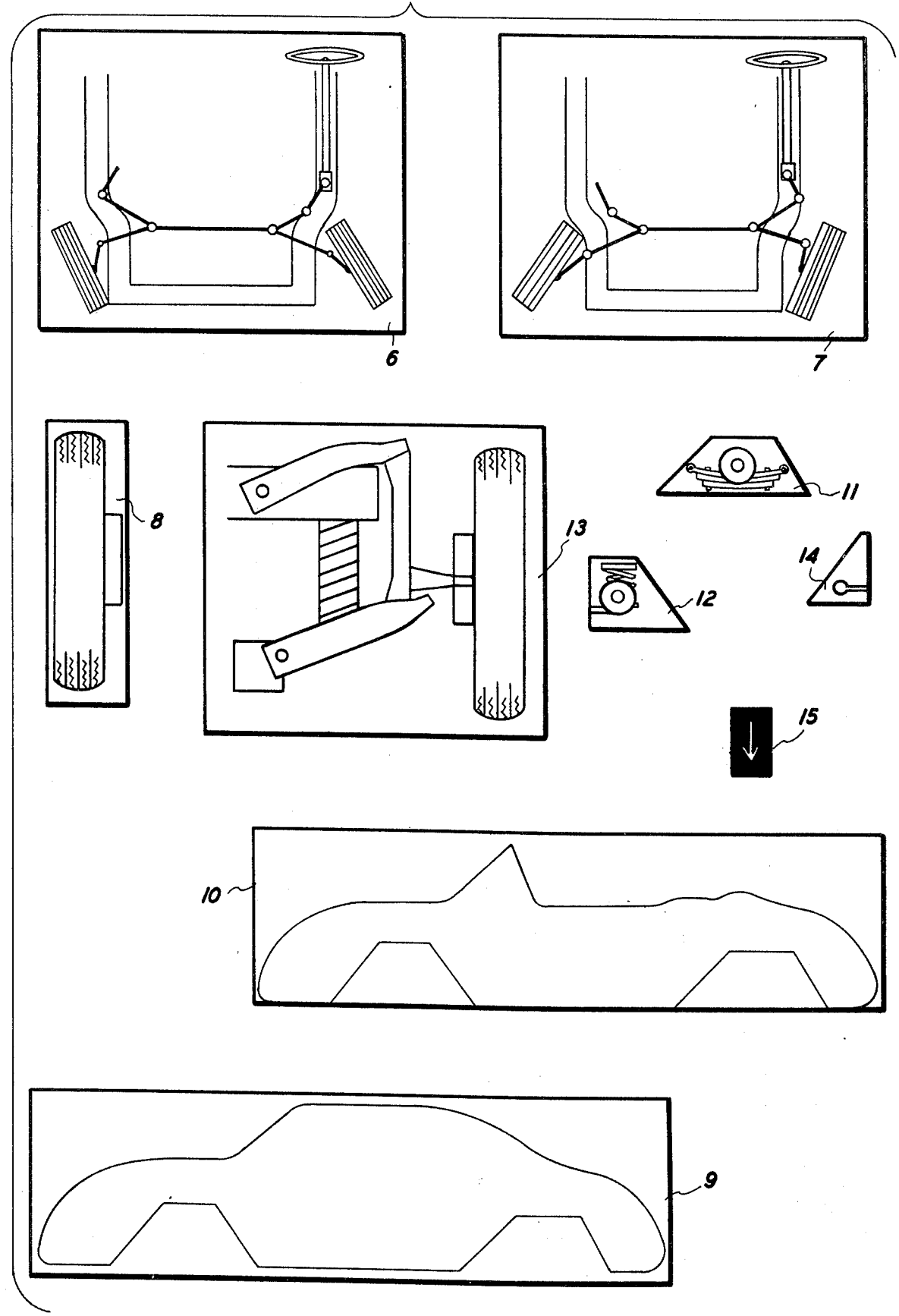
FIG. 3 is a plan view of the manipulative pieces having graphic indicia thereon representative of the various parts of the automobile suspension or steering systems, or views of the steering and suspension system during various phases of operation.

The manipulative pieces used in the educational kit are shown in FIG. 3. Each of these pieces consists of a flat sheet of a rigid material such as metal or plastic upon which is printed one of several schematic indicia representative of various parts of the automobile suspension or steering system, or schematic views of these systems during various phases of operation. In the preferred embodiment, the pieces are made of a plastic material such as polyvinylchloride having a thickness of about 1/16 inch and having smaller sections of a magnetically attractive material laminated to the underside thereof. The smaller sections also serve to provide a gap between the piece and the surface upon which it is resting to facilitate gripping and manipulation of the piece on flat surfaces. The indicia represented on the various pieces are a schematic of the automobile steering linkage in position for a left turn 6, a schematic of the automobile steering linkage in position for a right turn 7, a schematic of a wheel 8, a schematic outline of a sedan body 9 which is used to simulate unit body construction, a schematic outline of a convertible body 10 which is used to simulate frame body construction, a schematic of a leaf spring 11, a schematic of a coil spring 12, a schematic of the front wheel suspension in a compressed or loaded condition 13, and a schematic of a control arm 14. Also included is a piece having an arrow 15 thereon which may be used to show the direction in which weight or forces are applied to the suspension systems. The size and shape of the pieces is such that they fit or can be manipulated at the appropriate indicia present on the simulator board.

Figure 4:
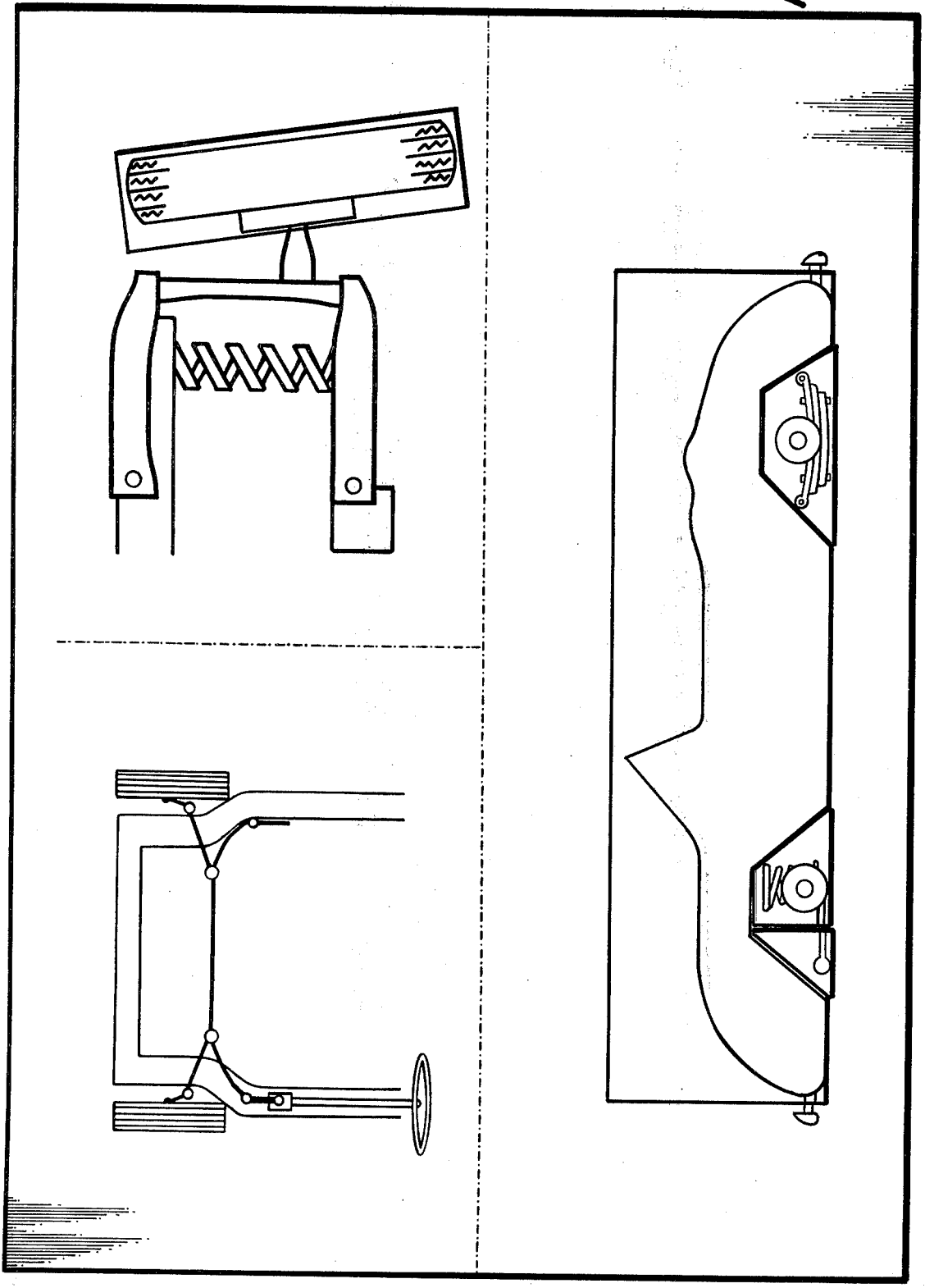
FIG. 4 is a plan view of the simulator board with certain of the manipulative pieces in place.
Figure 5:
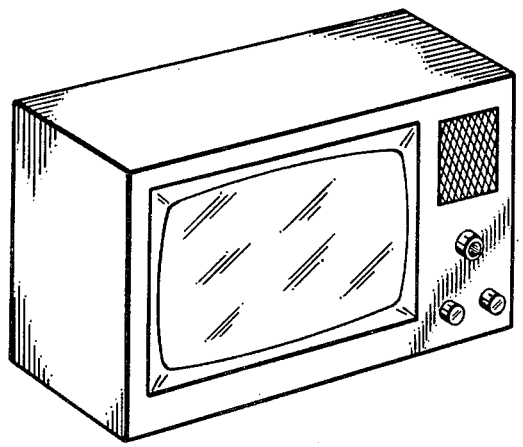
FIG. 5 illustrates generally an audiovisual device suitable for use in the present invention.
Figure 6:
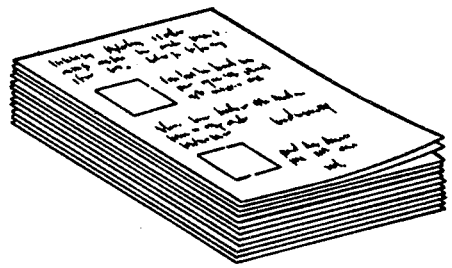
FIG. 6 illustrates generally worksheets in accordance with the present invention.
Figure 7:
FIG. 7 is a side sectional view of a typical manipulative piece in accordance with the invention showing smaller magnetic sections laminated to the underside of the piece.

In FIG. 4 the simulator board 1 is depicted with some of the pieces representing an automobile body, springs and control arm in place. Also shown is piece 8 in place at 3 on the simulator board depicting an improperly alligned wheel having a negative camber.

As indicated above, the surfaces of the simulator board, the display board and at least the bases of the manipulative pieces are made from or contain a magnetically attractive material. The term magnetically attractive material is intended to encompass a material that is either itself magnetic or a material that is attracted to a magnet. Thus, where the surface of the boards is magnetic, the bases of the pieces need be only of a material that is attracted to a magnet. In the simpler and preferred embodiment, the bases of the pieces have laminated thereto a section of a magnetic material such as magnetic plastic or metal, and the boards are made of material that is attractive to a magnet such as galvanized steel.

All of the above material are most conveniently supplied housed in a compartmentalized case for easy use and storage. Thus, the educational kit includes the simulator board, the display board, the manipulative pieces, the visual slides or tapes and the audio cassette. The kit may also include student worksheets, sample tests or quizzes to be given by the instructor before and after use of the unit and an instructor's manual.

To illustrate how the educational kit is used, the audio-visual presentation begins with introduction dealing with the various types of body styles employed in automobile construction. This is followed by a discussion of the two main types of body construction such as unitized or body frame design, and the advantages and disadvantages of each. The presentation then focuses on the suspension system with discussion concerning the various types of springs that are used in automobile suspension construction such as the coil, leaf or torsion bar springs. This instructional material is presented to the student by means of visual slides and a synchronized audio presentation. At certain points during the presentation, the student is asked to turn to the simulator board and accessories and place one of the pieces representative of a particular body style over the frame depicted on the simulator board. He might then be asked to position pieces bearing indicia representative of the various springs used in the suspension system in the proper places. After further discussion, of, for example, the automobile steering system and of the various parts associated therewith such as the Pitman arm, the relay rod, the idler arm, and the tie rods, the student might then be asked to position one of several pieces depicting the steering system and the various components thereof in position for straight ahead movement, for right turn movement, and for left turn movement. Next, the audio visual presentation focuses on the wheel and its role in the suspension and steering system. The importance of proper alignment and balancing is emphasized and the student is introduced to the terms caster, camber, and tow-in. At this point, the student might then be asked to manipulate the piece representative of the automobile wheel on the simulator board to show, for example, a wheel having negative camber. The simulator board and the accessory pieces thus permit the student any of a number of relationships which graphically depict the automobile suspension and steering system, as well as show how the various components of these systems function during operation, thereby permitting the student to demonstrate his understanding of these systems.

The above-described educational unit is programmed such that the student will encounter a minimum of frustration and a maximum of learning efficiency during use of the kit. Upon completion of the unit, the learner should be able to define or describe in one sentence or less most of the major parts involved in the automobile suspension and steering system such as the frame, springs, the shock absorbers, the torsion bar, the relay rod, meaning of terms such as caster, camber and town-in or tow-out. The student should also be able to describe in one paragraph or less two basic vehicle construction methods and how suspension system attachment differs for these two styles, describe in one paragraph or less the basic sequence of action that changes rotation of the steering wheel into directional changes of the front wheels, describe in one sentence or less the operation of disk brake calipers and drum brake shoes, name two functions of suspension system springs, name the two principal functions of tires, name two categories of wheel balancing operation methods and describe each in two sentences or less, state in a paragraph or less what is meant by wheel balancing and the changes made to achieve balance, and the like.

The complete description of the educational kit encompassed by the present invention may be found in a booklet entitled "Automotive Technology — Suspension System Fundamentals" (Unit 10109-80) published as part of the Occupational Technology Series by the Xerox Corporation.

What is claimed is:

1. An educational kit programmed for teaching automobile suspension and steering systems comprising as integrated component parts thereof:
   a. a simulator board having a surface of magnetically attractive material and including graphic indicia on the surface thereof depicting an automobile steering linkage, a front wheel suspension, and a side view of an automobile frame, the indicia on said simulator board being as shown by the non-numerical indicia of FIG. 1;
   b. a plurality of magnetically attractive manipulative pieces individually bearing on their surfaces specific graphic indicia depicting views of the steering linkage, suspension system or various parts which constitute these systems, the indicia on said manipulative pieces being as shown by the non-numerical indicia of FIG. 3;

said magnetically attractive board or alternatively each of said magnetically attractive pieces being magnetic to provide a mutual attraction between said board and said pieces; and c. audio-visual instructional means including synchronized recordings and visual slides or filmstrips presenting information relevant to automotive steering and suspension systems including information defining the relationship between the indicia on said pieces and the indicia on said simulator board;

said audio-visual instructional means further characterized in that it is periodically stoppable to permit the user to perform a manipulative activity requested by the instructional means using said simulator board and said manipulative pieces, and being restartable again by the user upon completion of activity;

d. a display board for said manipulative pieces including a sheet of magnetically attractive material, said display board having graphic indicia on a surface thereof in spaced relationship, said graphic indicia corresponding to the indicia present on each of said manipulative pieces, said manipulative pieces adapted for storage on and removal from said display board.

2. An educational kit according to claim 1 wherein said instruction means includes a plurality of student work sheets, said work sheets being adapted for use by the student to record information and test the student in response to said audiovisual instruction means.

3. An educational kit according to claim 1 wherein the manipulative pieces are magnetic.

4. An educational kit according to claim 3 wherein the manipulative pieces are constructed of a flat sheet of plastic material having smaller sections of a magnetic material laminated thereto.

* * * * *